US010655759B2

(12) United States Patent
Elliott et al.

(10) Patent No.: US 10,655,759 B2
(45) Date of Patent: May 19, 2020

(54) PIPE WITH ALTERNATING SECTIONS

(71) Applicant: OmniMax International, Inc., Norcross, GA (US)

(72) Inventors: Benjamin Randolph Elliott, Chattanooga, TN (US); Donald Stephen Gazdick, III, Suwanee, GA (US); Bryan Garth Lamb, Athens, TN (US); John Earnest Satta, III, Delano, TN (US); Jeffrey Eugene Smith, Alpharetta, GA (US)

(73) Assignee: OmniMax International, Inc., Norcross, GA (US)

( * ) Notice: Subject to any disclaimer, the term of this patent is extended or adjusted under 35 U.S.C. 154(b) by 81 days.

(21) Appl. No.: 15/949,175

(22) Filed: Apr. 10, 2018

(65) Prior Publication Data

US 2018/0292032 A1    Oct. 11, 2018

Related U.S. Application Data

(60) Provisional application No. 62/483,796, filed on Apr. 10, 2017.

(51) Int. Cl.
*F16L 11/15*      (2006.01)
*B65D 85/14*      (2006.01)
(Continued)

(52) U.S. Cl.
CPC ............... *F16L 11/15* (2013.01); *B65D 85/14* (2013.01); *F16L 43/008* (2013.01); *B65D 85/08* (2013.01)

(58) Field of Classification Search
CPC .......... F16L 11/15; F16L 43/008; B65D 85/14
(Continued)

(56) References Cited

U.S. PATENT DOCUMENTS 2,582,249 A * 1/1952 Hendel ............... F16L 27/11
285/226
3,374,634 A    3/1968 Fochler
(Continued)

FOREIGN PATENT DOCUMENTS

CA        177610      11/2018
CA        182885      11/2018

OTHER PUBLICATIONS

Non Final Office Action for U.S. Appl. No. 29/600,201, dated Apr. 19, 2018, 8 Pages.
(Continued)

*Primary Examiner* — Patrick F Brinson
(74) *Attorney, Agent, or Firm* — Kilpatrick Townsend & Stockton LLP

(57) ABSTRACT

A plastic drain pipe for drainage includes a first end, a second end, and a pipe sub-section between the first end and the second end. The pipe sub-section includes a collapsible section of corrugated pipe, a first non-collapsible section of corrugated pipe, and a second non-collapsible section of corrugated pipe. The collapsible section of corrugated pipe has a first joining area and a second joining area. The first non-collapsible section of corrugated pipe is connected to the collapsible section of corrugated pipe at the first joining area, and the second non-collapsible section of corrugated pipe is connected to the collapsible section of corrugated pipe at the second joining area. An outermost diameter of the collapsible section of corrugated pipe is approximately the same as an outermost diameter of the first non-collapsible section of corrugated pipe and an outermost diameter of the second non-collapsible section of corrugated pipe.

20 Claims, 16 Drawing Sheets

(51) Int. Cl.
*F16L 43/00* (2006.01)
*B65D 85/08* (2006.01)

(58) Field of Classification Search
USPC .......... 138/121, 122, 119, 118, 109; 68/208; 206/321
See application file for complete search history.

(56) References Cited

U.S. PATENT DOCUMENTS

| | | | | |
|---|---|---|---|---|
| 3,409,224 | A | 11/1968 | Harp et al. | |
| 3,559,692 | A | 2/1971 | Mantelet | |
| 4,307,754 | A | 12/1981 | Muratsubaki | |
| 4,314,717 | A * | 2/1982 | Bjurman | B05B 15/652 285/5 |
| 4,771,884 | A * | 9/1988 | Lamborn | B65D 85/14 206/321 |
| 4,909,547 | A * | 3/1990 | Guy | F16L 25/0036 138/121 |
| 4,987,996 | A * | 1/1991 | Anderson | B65D 5/16 206/321 |
| 5,311,753 | A * | 5/1994 | Kanao | D06F 39/08 138/103 |
| 5,393,260 | A | 2/1995 | Barth | |
| 5,704,401 | A * | 1/1998 | Fukui | F16L 11/11 138/121 |
| 6,142,188 | A | 11/2000 | Schaerfl et al. | |
| 6,227,578 | B1 | 5/2001 | Fukui et al. | |
| 7,597,119 | B2 | 10/2009 | Boettner | |
| 7,677,271 | B2 | 3/2010 | Boettner et al. | |
| D672,440 | S * | 12/2012 | Mears | D23/266 |
| D839,401 | S | 1/2019 | Elliot et al. | |
| 2003/0178846 | A1 | 9/2003 | Ezura | |
| 2009/0032131 | A1 | 2/2009 | Boettner | |
| 2012/0144858 | A1 | 6/2012 | Logan et al. | |
| 2012/0255329 | A1 * | 10/2012 | Wanweerakul | D06F 39/083 68/208 |
| 2014/0130929 | A1 | 5/2014 | Elliott et al. | |
| 2014/0150889 | A1 | 6/2014 | Ragner | |

OTHER PUBLICATIONS

ADS, Inc. Drainage Handbook, Specifications, available online at http://www.ads-pipe.com/sites/default/files/Drainage_Handbook_ADH1_%2802-17%29_Revised.pdf, Feb. 2017, 52 pages.
CA 177,610, "Office Action," dated May 7, 2018, 3 pages.
U.S. Appl. No. 29/600,201, "Notice of Allowance," dated Sep. 6, 2018, 7 pages.

* cited by examiner

PIPE WITH ALTERNATING SECTIONS

REFERENCE TO RELATED APPLICATION

This application claims the benefit of U.S. Provisional Application No. 62/483,796, filed Apr. 10, 2017, and entitled PIPE WITH ALTERNATING SECTIONS, the content of which is hereby incorporated by reference in its entirety.

FIELD OF THE INVENTION

This application relates to plastic drain pipe and, more particularly, to a drain pipe with alternating collapsible and non-collapsible pipe sections.

BACKGROUND

Drain pipes (or tubes) are typically used in the drainage of soil and surface water for agricultural, septic, residential, civil construction, or recreational purposes, among others. This pipe is typically made of a high density polyethylene (HDPE) or other similar material. The plastic drain pipe may be corrugated on the exterior.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In various examples, a plastic drain pipe for drainage includes a first end, a second end, and a pipe sub-section between the first end and the second end. The pipe sub-section includes a collapsible section of corrugated pipe, a first non-collapsible section of corrugated pipe, and a second non-collapsible section of corrugated pipe. The collapsible section of corrugated pipe has a first joining area and a second joining area. The first non-collapsible section of corrugated pipe is connected to the collapsible section of corrugated pipe at the first joining area, and the second non-collapsible section of corrugated pipe is connected to the collapsible section of corrugated pipe at the second joining area. An outermost diameter of the collapsible section of corrugated pipe is approximately the same as an outermost diameter of the first non-collapsible section of corrugated pipe and an outermost diameter of the second non-collapsible section of corrugated pipe.

According to some examples, a method of packaging a plastic drain pipe for drainage includes directing collapsible section of corrugated pipe of a pipe sub-section between a first end and a second end of the plastic drain pipe to form a bend. The method also includes moving a first non-collapsible section of corrugated pipe connected to the collapsible section of corrugated pipe at a first joining area to be adjacent to a second non-collapsible section of corrugated pipe connected to the collapsible section of corrugated pipe at a second joining area of the collapsible section opposite the first joining area.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," and "back," among others are intended to refer to the orientation as illustrated and described in the figure (or figures) to which the components and directions are referencing.

Figure 1:
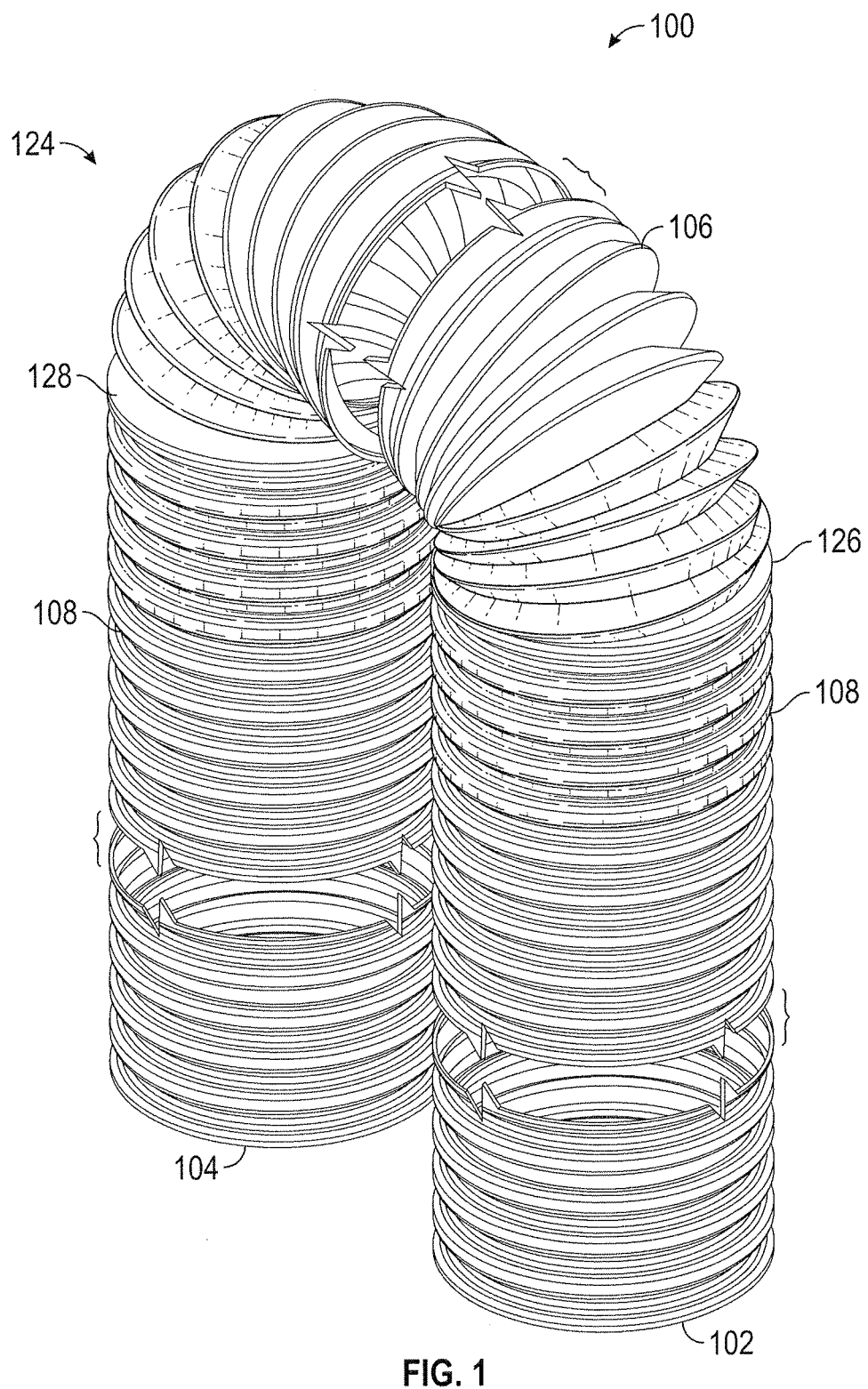
FIG. 1 is a perspective view of a pipe according to aspects of the present disclosure.

FIG. 1 illustrates a drain pipe 100 according to aspects of the present disclosure. The drain pipe 100 includes a first end 102 and a second end 104. A distance from the first end 102 to the second end 104, or a length of the drain pipe 100, can vary and should not be considered limiting on the current disclosure. In some examples, the ends 102 and 104 include cuffs and/or fittings (not shown) for connecting the pipe 100 to other devices and components. The cuffs and fittings may be integrally formed with the pipe 100 or may be separate components that attach to the pipe 100.

As illustrated in FIG. 1, the drain pipe 100 includes alternating sections of collapsible corrugated pipe 106 and non-collapsible corrugated pipe 108 that are integrally or monolithically formed with one another through a suitable molding or other forming process. The number of sections of collapsible corrugated pipe 106 and non-collapsible corrugated pipe 108 can vary and is not limited to the illustrated arrangement.

Figure 2:
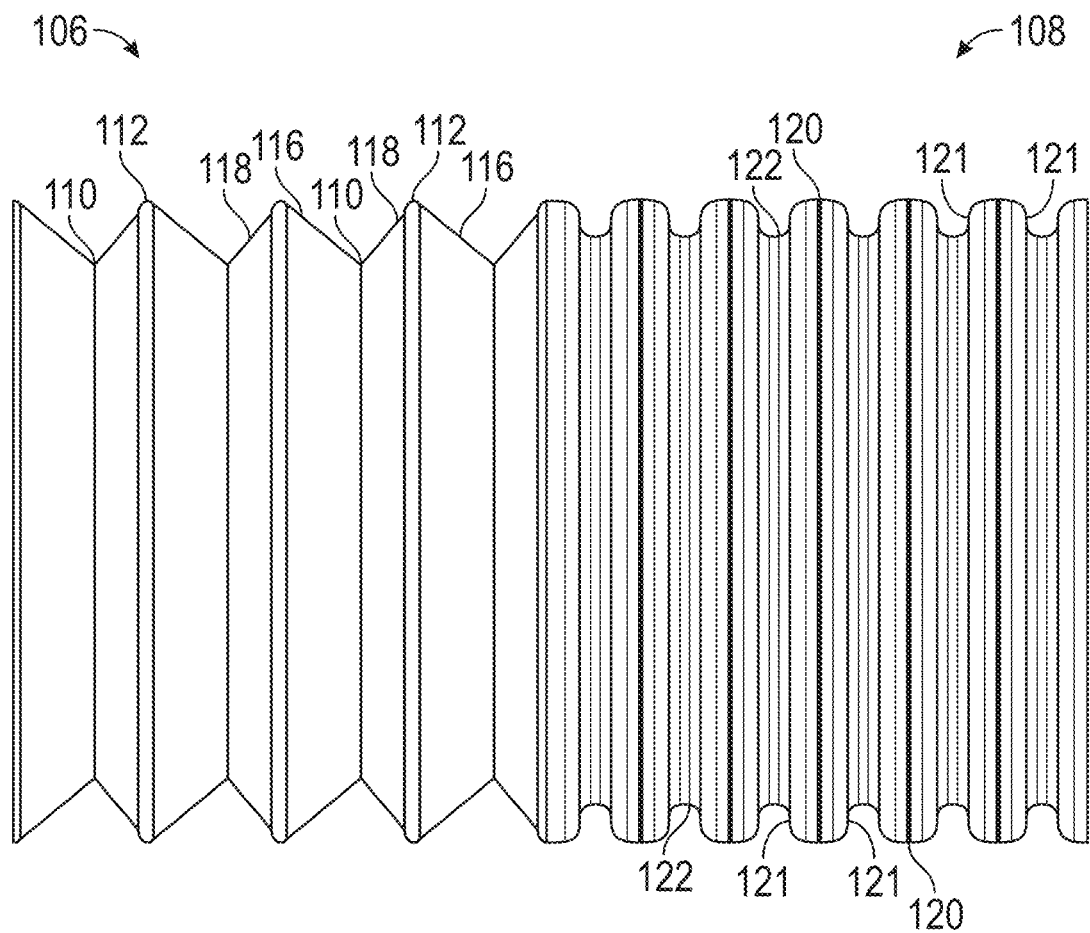
FIG. 2 is a partial side view showing a section of collapsible pipe and a section of non-collapsible pipe of the pipe of FIG. 1.
Figure 4:
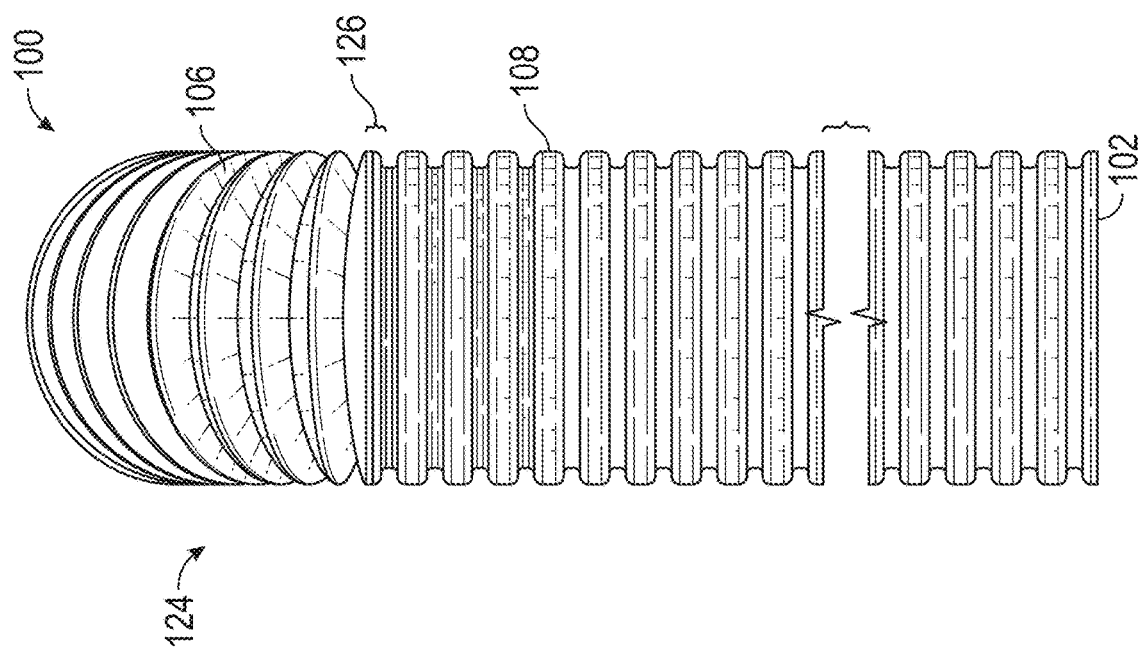
FIG. 4 is a side view of the pipe of FIG. 1.
Figure 3:
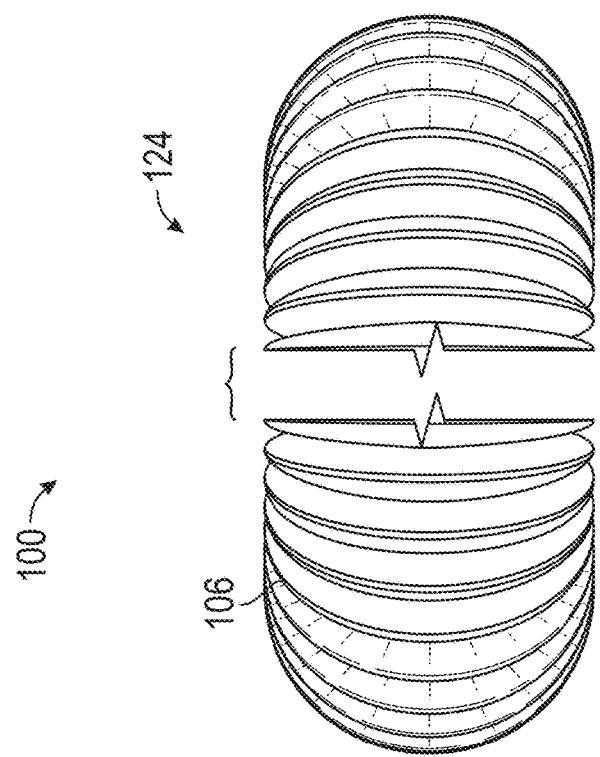
FIG. 3 is a top view of the pipe of FIG. 1.

Referring to FIG. 2, each section of collapsible corrugated pipe 106 includes a plurality of annular corrugations of alternating smaller, minimum or minor diameter rings 110 separated by larger, maximum or major diameter rings 112. The minor diameter rings 110 are connected to the major diameter rings 112 by alternating static walls 116 and tuck walls 118, which permit the section of pipe 106 to be in an extended state (see FIG. 2), a collapsed state, or a curved or directed state (see FIGS. 3-18). Generally, the pipe 106 is compressed (i.e. in the compressed state or the curved state) when the corrugations are collapsed such that at least some of the tuck walls 118 are folded inward against the static walls 116. The pipe 106 is expanded when the tuck walls 118 are folded outward and apart from the static walls 116 to the extent possible. For example, in some examples, a maximum angular orientation between the tuck walls 118 and the static walls 116 may be about 90°, although in other examples, the maximum angular orientation may be less than about 90° or greater than about 90°.

Still referring to FIG. 2, each section of non-collapsible corrugated pipe 108 includes a plurality of annular corrugations of alternating smaller, minimum or minor diameter rings 122 separated by larger, maximum or major diameter rings 120. Unlike the collapsible corrugated pipe 106, adjacent walls 121 of the non-collapsible corrugated pipe 108 are not collapsible or expandable relative to each other. Compared to the collapsible corrugated pipe 106, a bend radius (or a minimum radius that a pipe can be bent) of the non-collapsible pipe 108 is greater than a bend radius of the collapsible corrugated pipe 106.

In various examples, an outermost diameter of the collapsible corrugated pipe 106 (formed by the major diameter rings 112) is approximately the same as an outermost diameter of the non-collapsible corrugated pipe 108 (formed by the major diameter rings 120). In some examples, an innermost diameter of the collapsible corrugated pipe 106 is approximately the same as an innermost diameter of the non-collapsible corrugated pipe 108, although it need not be. In some configurations, the innermost diameter of the collapsible corrugated pipe 106 is less than the innermost diameter of the non-collapsible corrugated pipe 108. In some examples, the innermost diameters may be about 3 inches, about 4 inches, or about 6 inches, although various other innermost diameters may be provided as desired.

Referring to FIG. 1, a pipe sub-section 124 generally includes a section of the collapsible corrugated pipe 106 connected to one or more sections of non-collapsible corrugated pipe 108. In some cases, the pipe sub-section 124 includes a section of collapsible corrugated pipe 106 connected to two sections of non-collapsible corrugated pipe 108. In various examples, the drain pipe 100 includes at least one pipe sub-section 124, although the number of pipe sub-sections 124 can vary and is not limited to the illustrated arrangement.

As illustrated in FIG. 1, at a first joining area 126 of the collapsible corrugated pipe 106, the collapsible corrugated pipe 106 is connected to a one of the two sections of non-collapsible corrugated pipe 108. At a second joining area 128 of the collapsible corrugated pipe 106, the collapsible corrugated pipe 106 is connected to a second of the two sections of non-collapsible corrugated pipe 108. In various examples, a length of the section of collapsible corrugated pipe 106 is less than a length of at least one of the two sections of non-collapsible corrugated pipe 108. However, in other examples, the ratio of the length of the collapsible corrugated pipe 106 to the length of the non-collapsible corrugated pipe 108 may be varied as desired such that the length of the collapsible corrugated pipe 106 is less than, about equal to, or greater than the length of the non-collapsible corrugated pipe 108. In various examples, the ratio of collapsible corrugated pipe 106 to non-collapsible corrugated pipe 108 within the pipe 100 may depend on desired properties or characteristics of the pipe 100. For example, if a user desires to have a majority of the pipe 100 act similar to traditional corrugated pipe while retaining some flexibility afforded by the collapsible corrugated pipe, a greater percentage of the pipe 100 may be non-collapsible corrugated pipe 108. Conversely, if a user desires to have a majority of the pipe 100 act similar to the collapsible corrugated pipe 106, a greater percentage of the pipe may be collapsible corrugated pipe 106.

Figure 5:
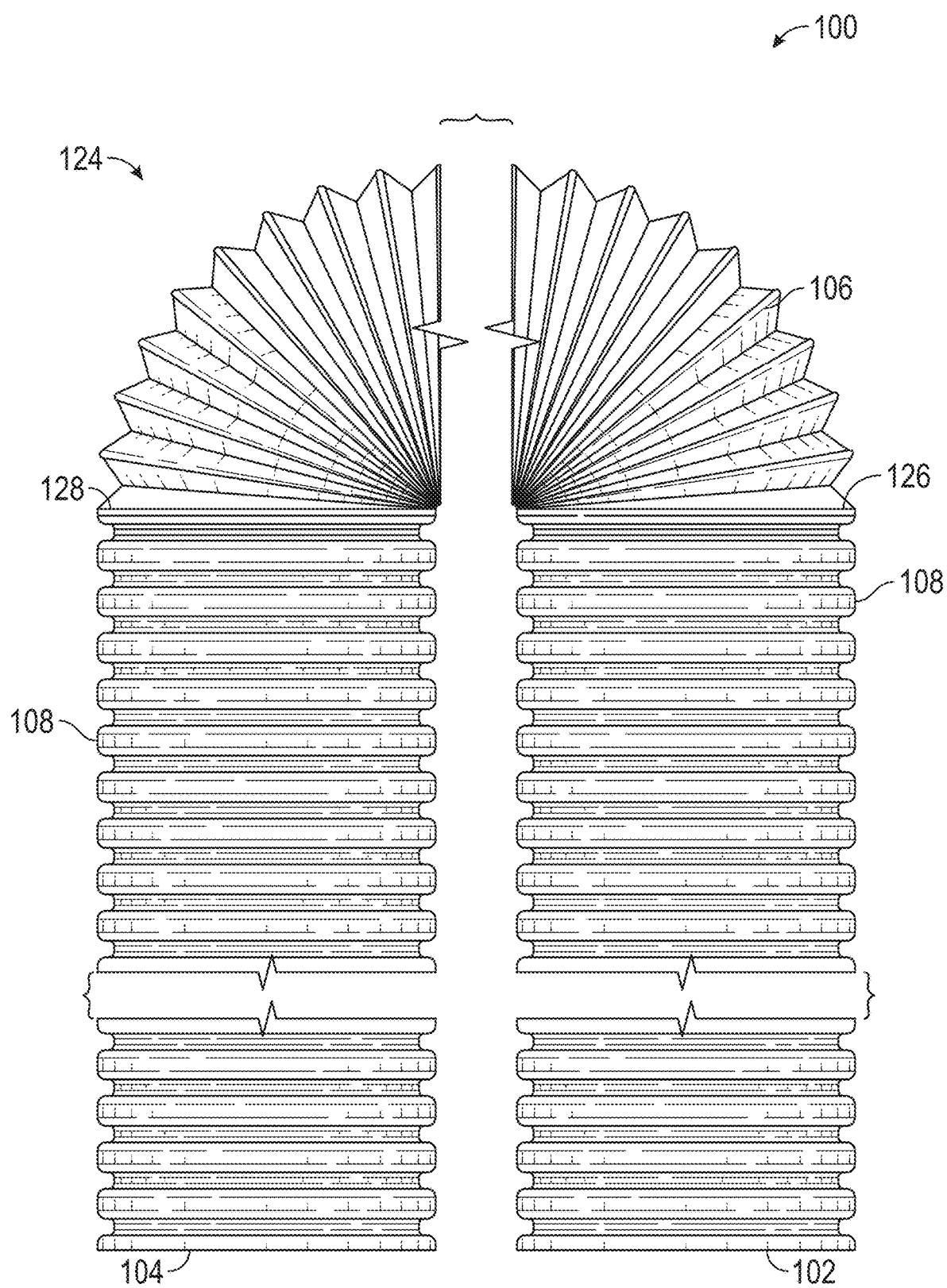
FIG. 5 is a front view of the pipe of FIG. 1.
Figure 6:
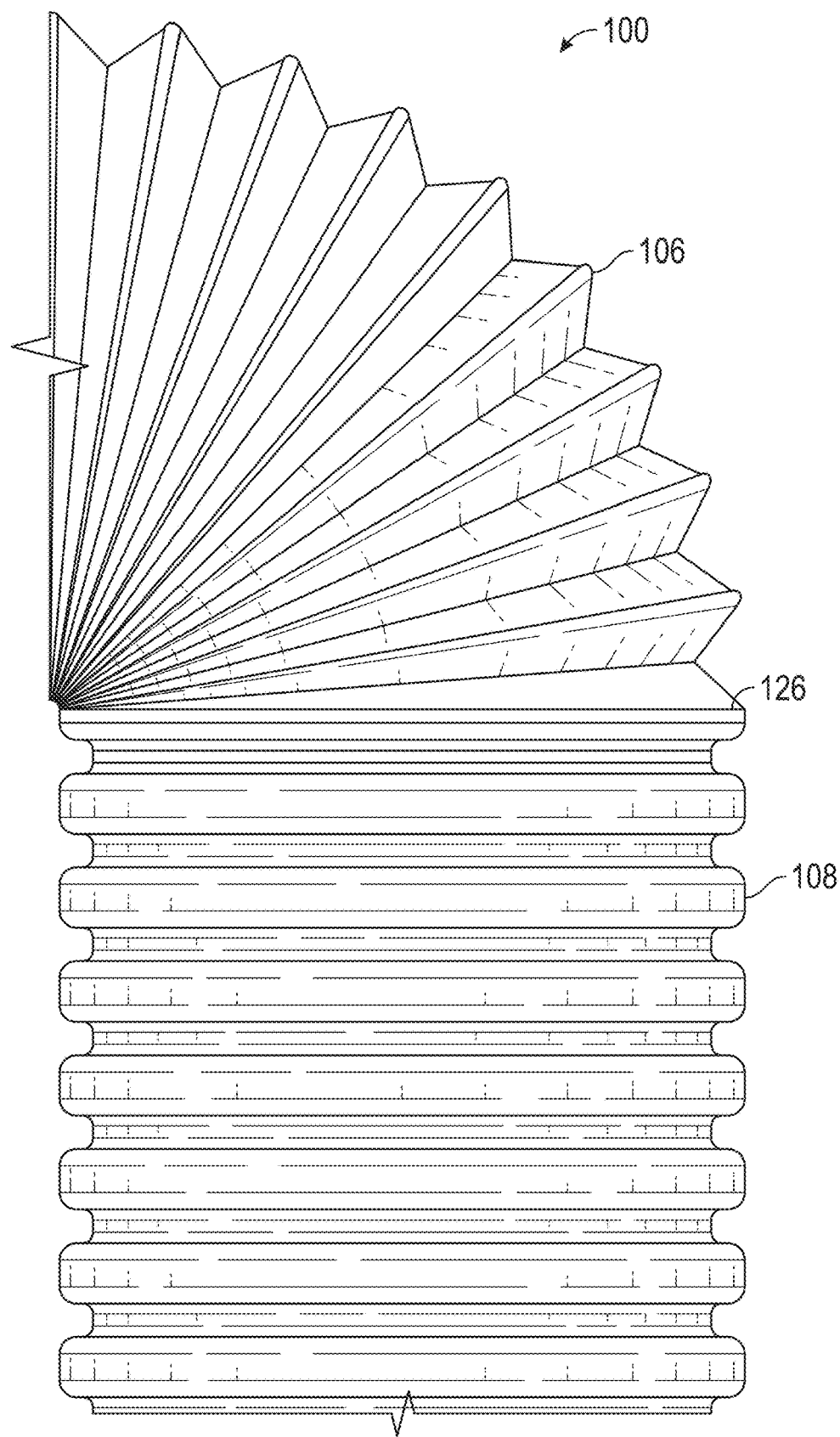
FIG. 6 is an enlarged front view of a portion of the pipe of FIG. 1.
Figure 7:
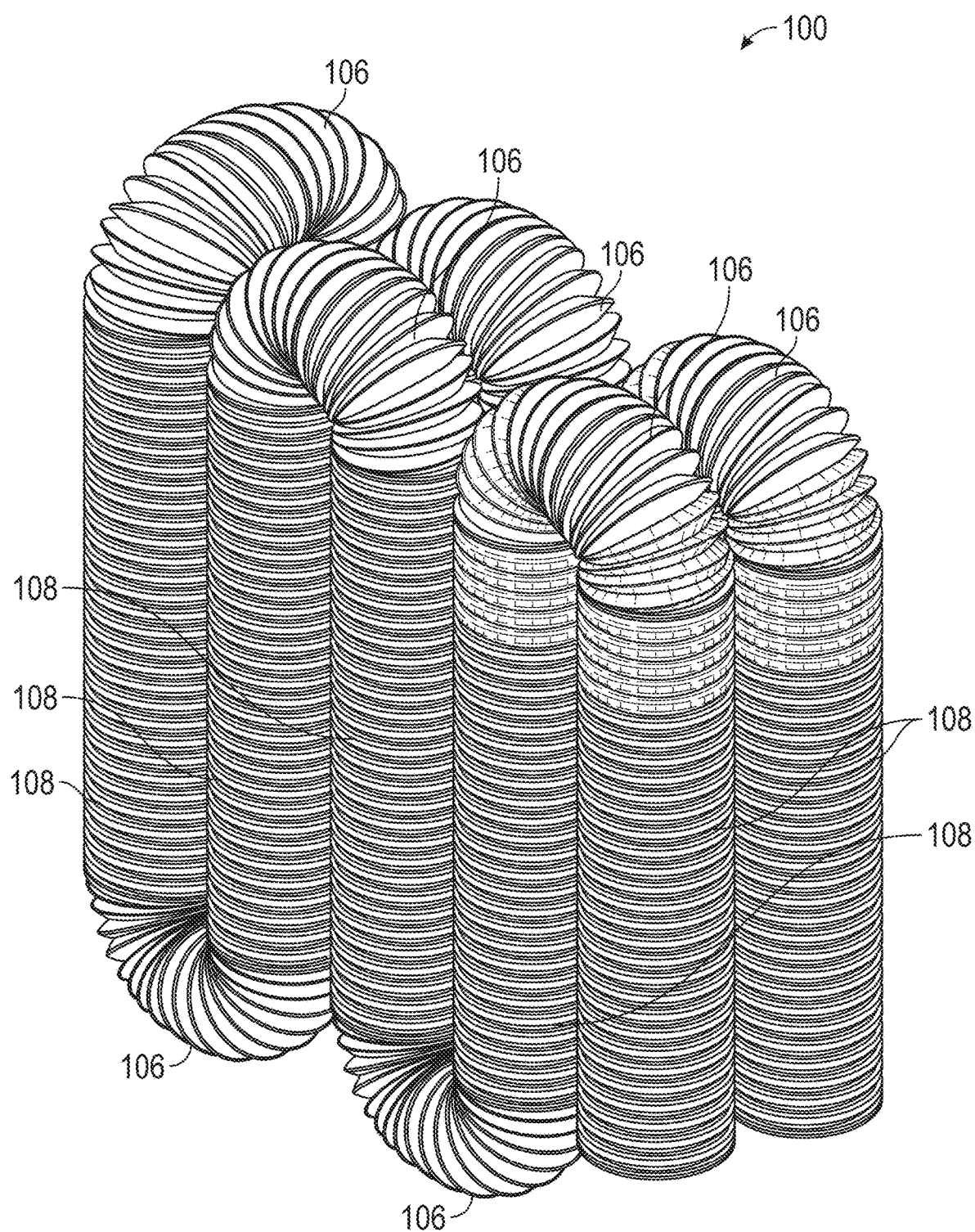
FIG. 7 is a perspective view of an exemplary packaging configuration for the pipe of FIG. 1.
Figure 9:
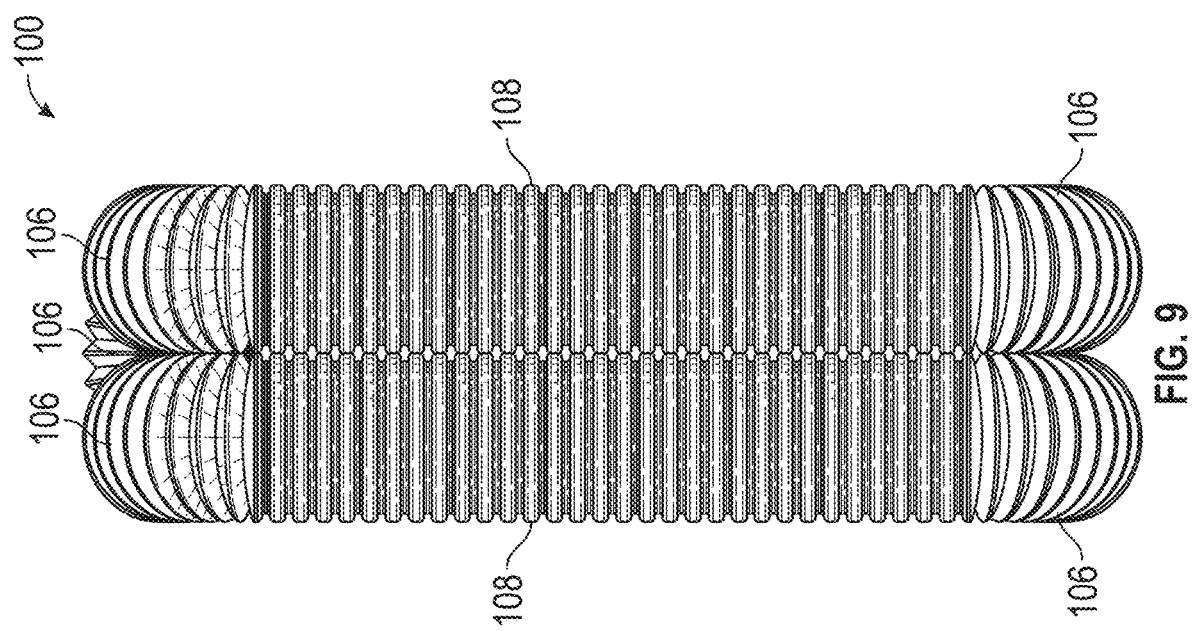
FIG. 9 is a side view of the configuration of FIG. 7.
Figure 8:
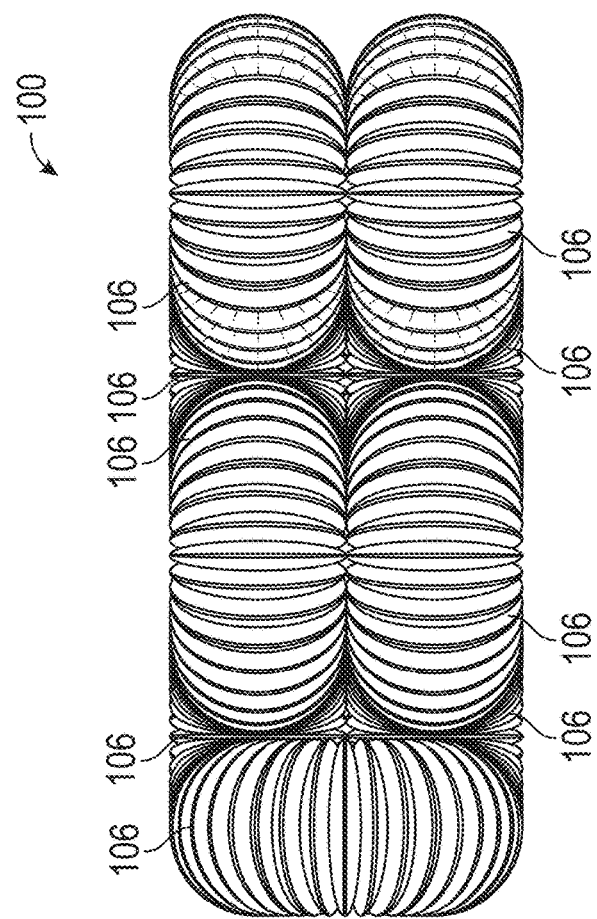
FIG. 8 is a top view of the configuration of FIG. 7.
Figure 10:
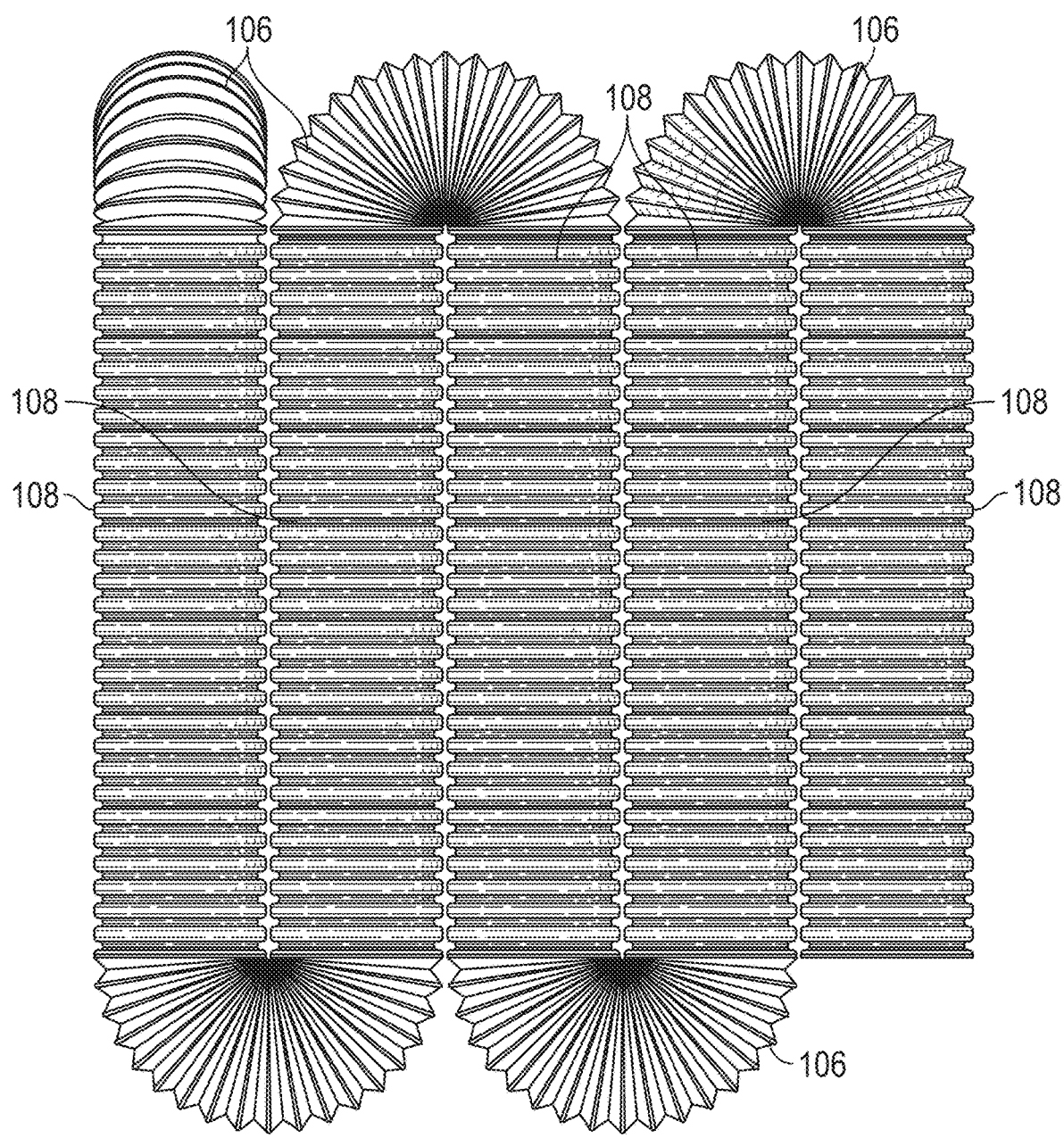
FIG. 10 is a front view of the configuration of FIG. 7.
Figure 11:
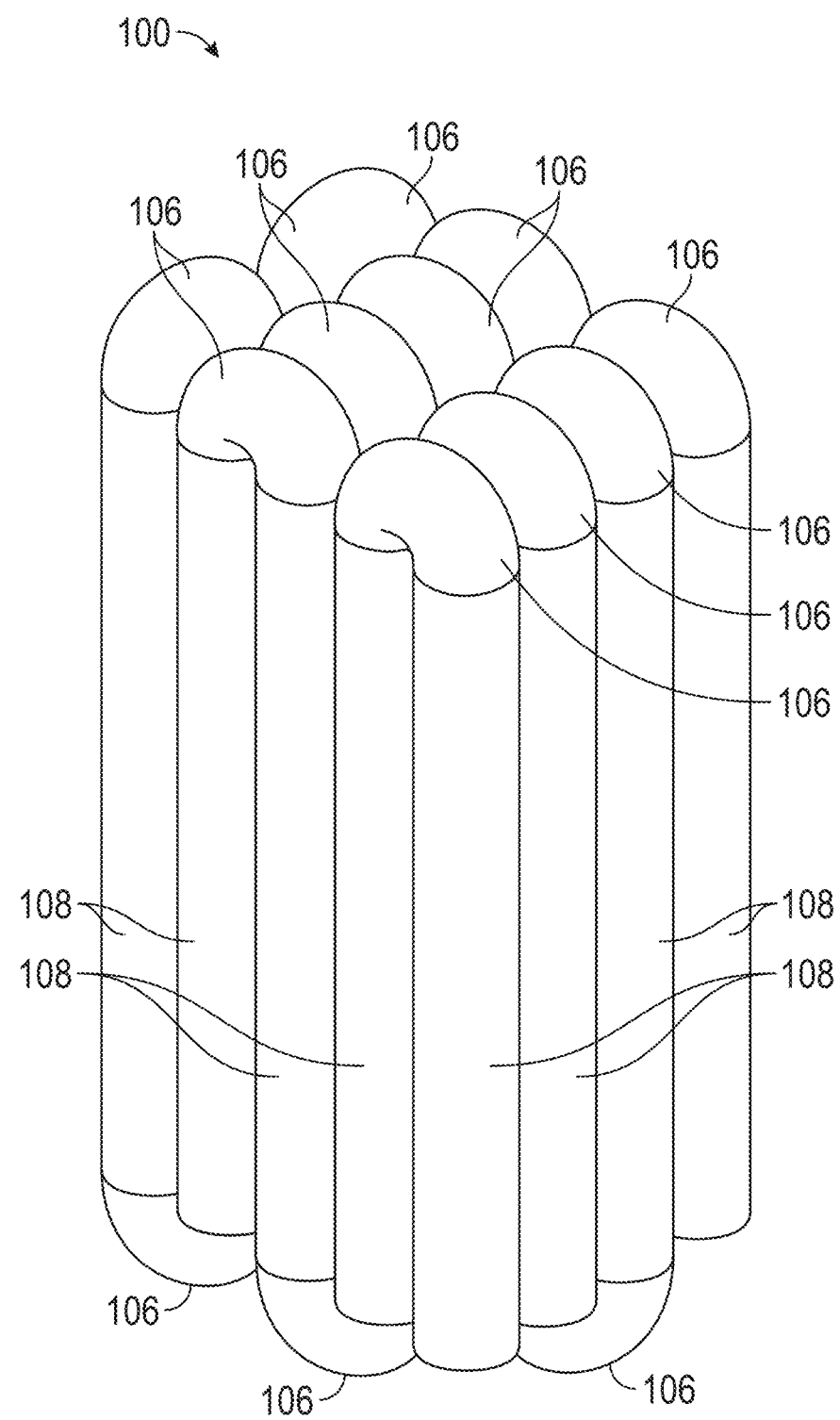
FIG. 11 is a perspective view of another exemplary packaging configuration for the pipe of FIG. 1.
Figure 12:
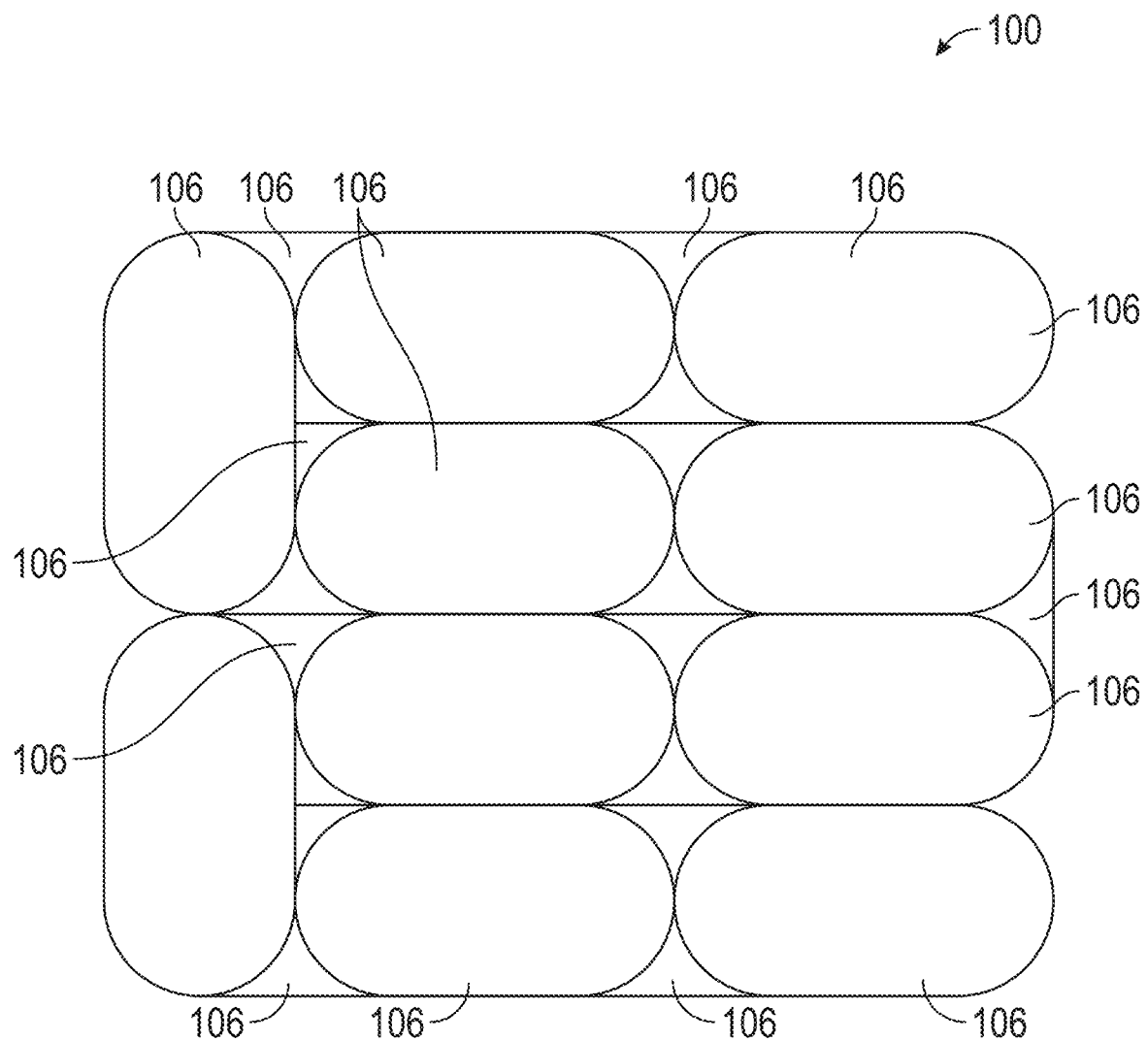
FIG. 12 is a top view of the configuration of FIG. 11.
Figure 13:
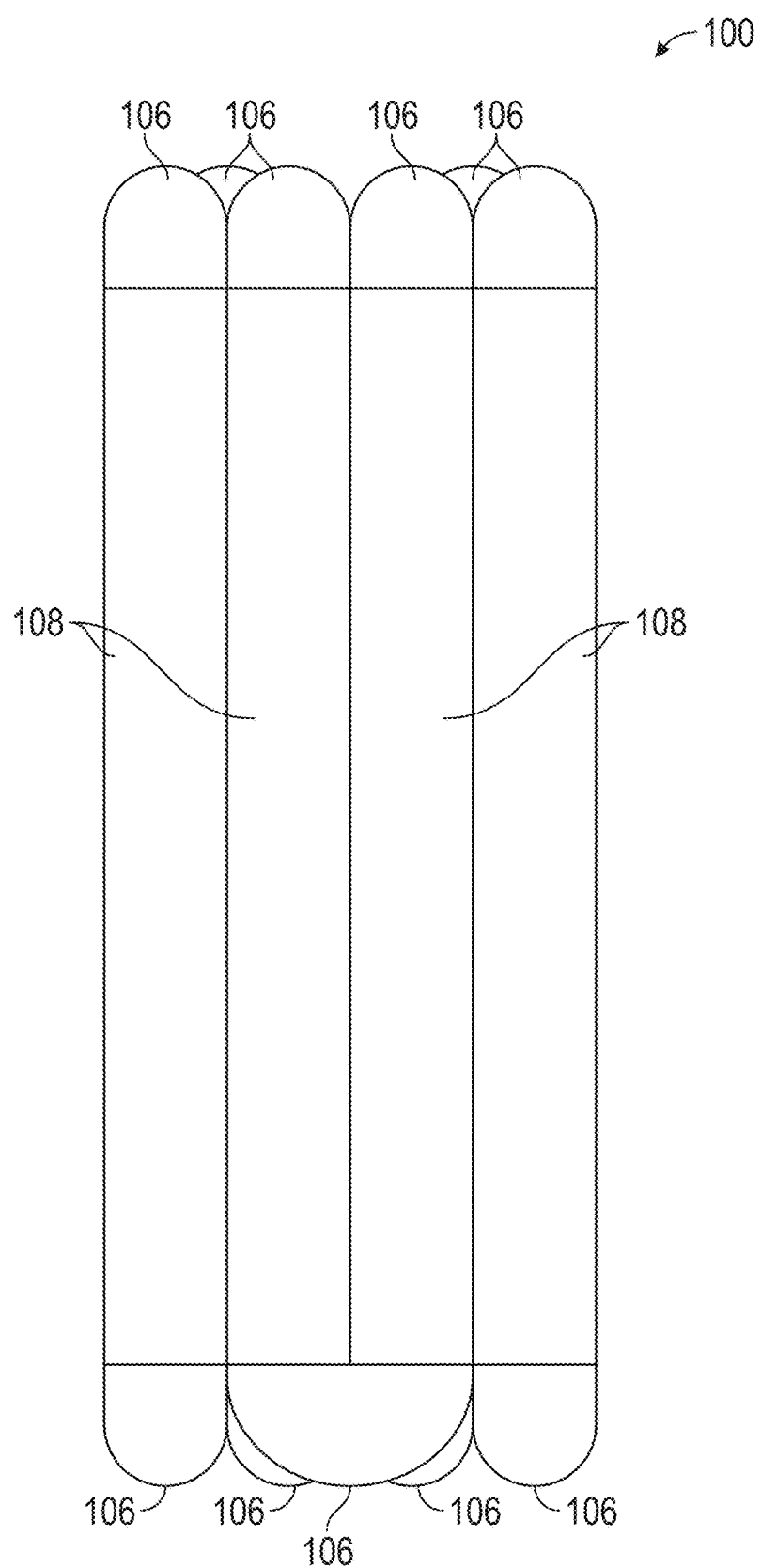
FIG. 13 is a side view of the configuration of FIG. 11.
Figure 14:
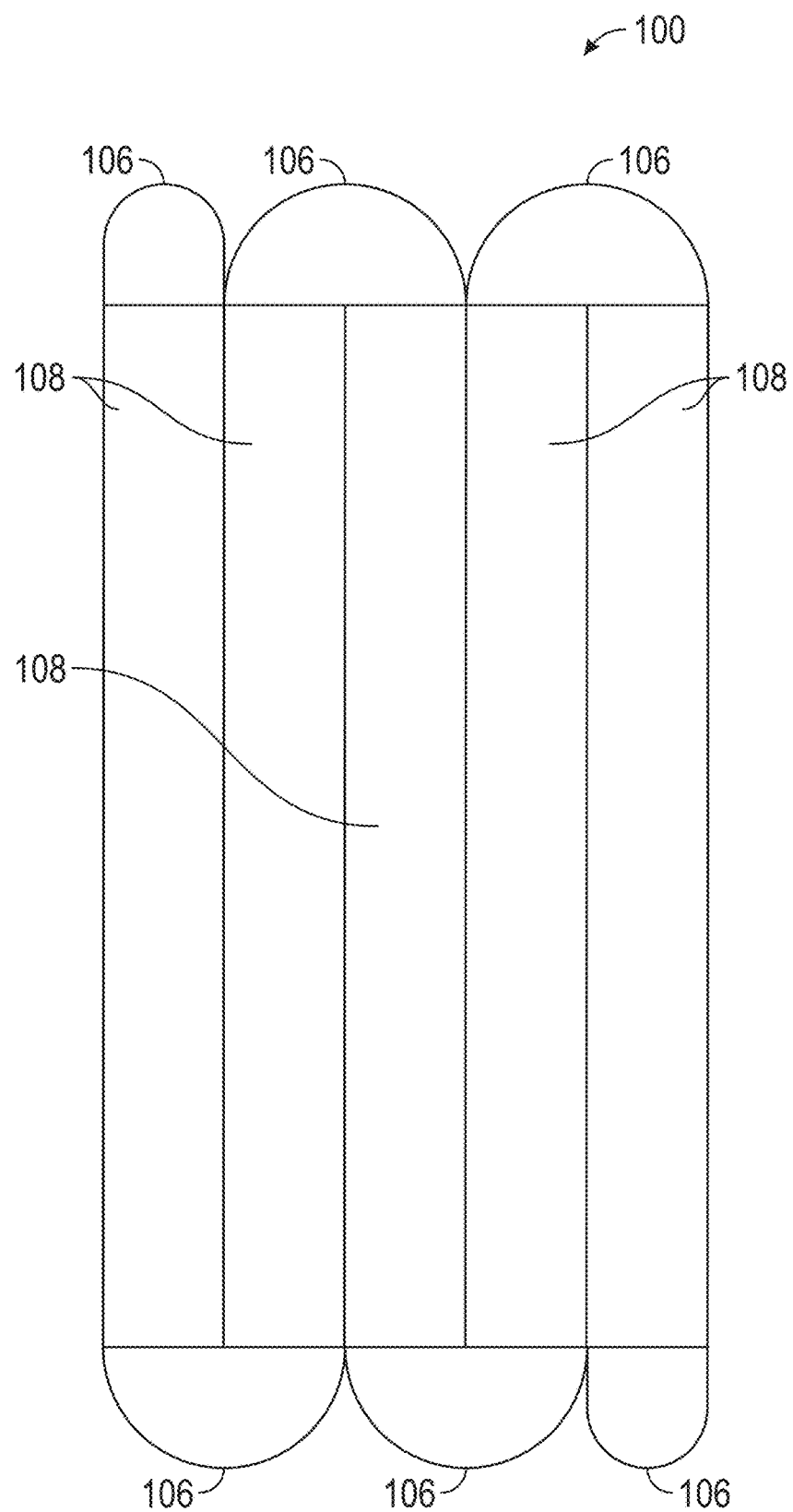
FIG. 14 is a front view of the configuration of FIG. 11.
Figure 15:
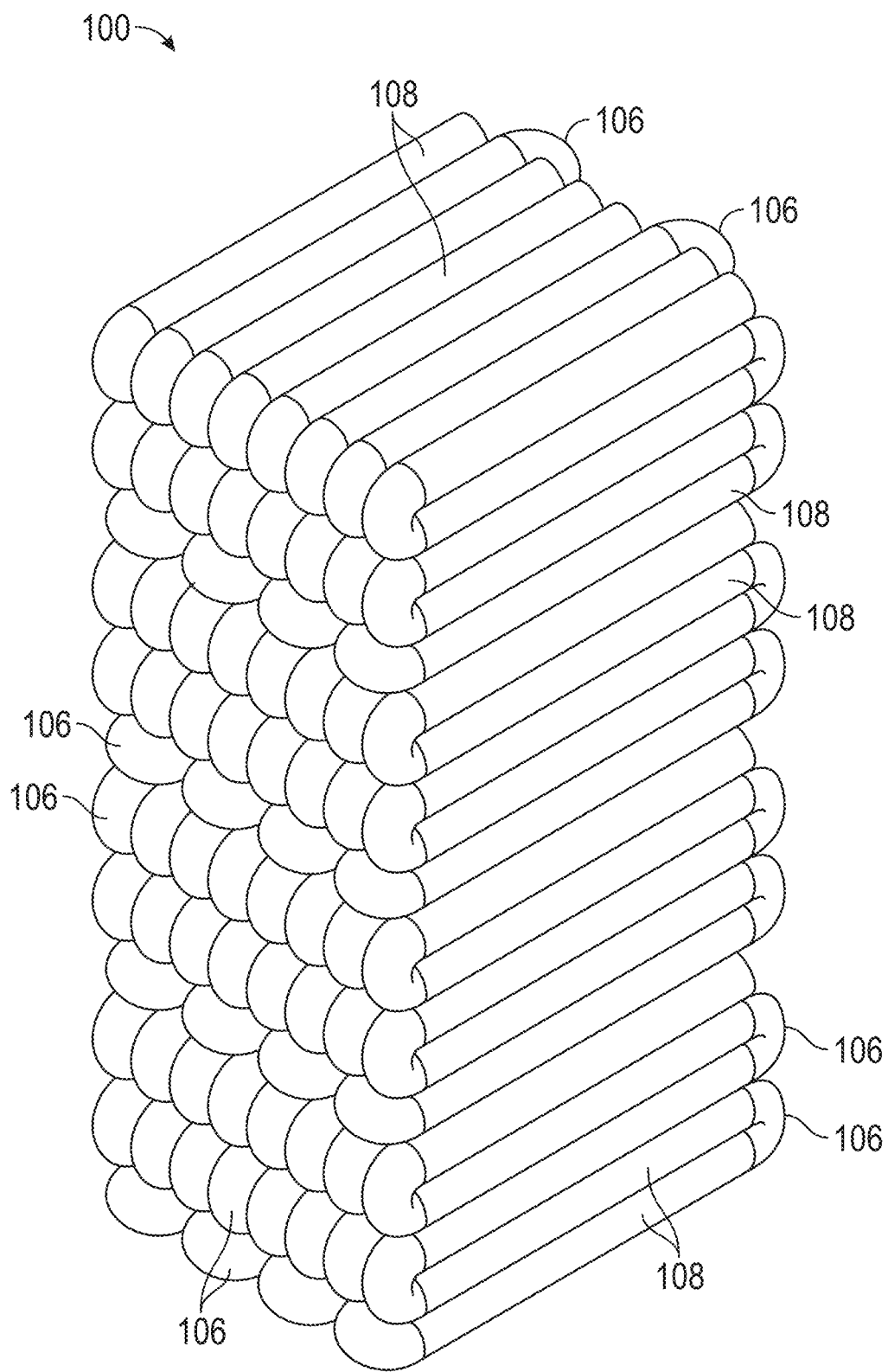
FIG. 15 is a perspective view of another exemplary packaging configuration for the pipe of FIG. 1.
Figure 16:
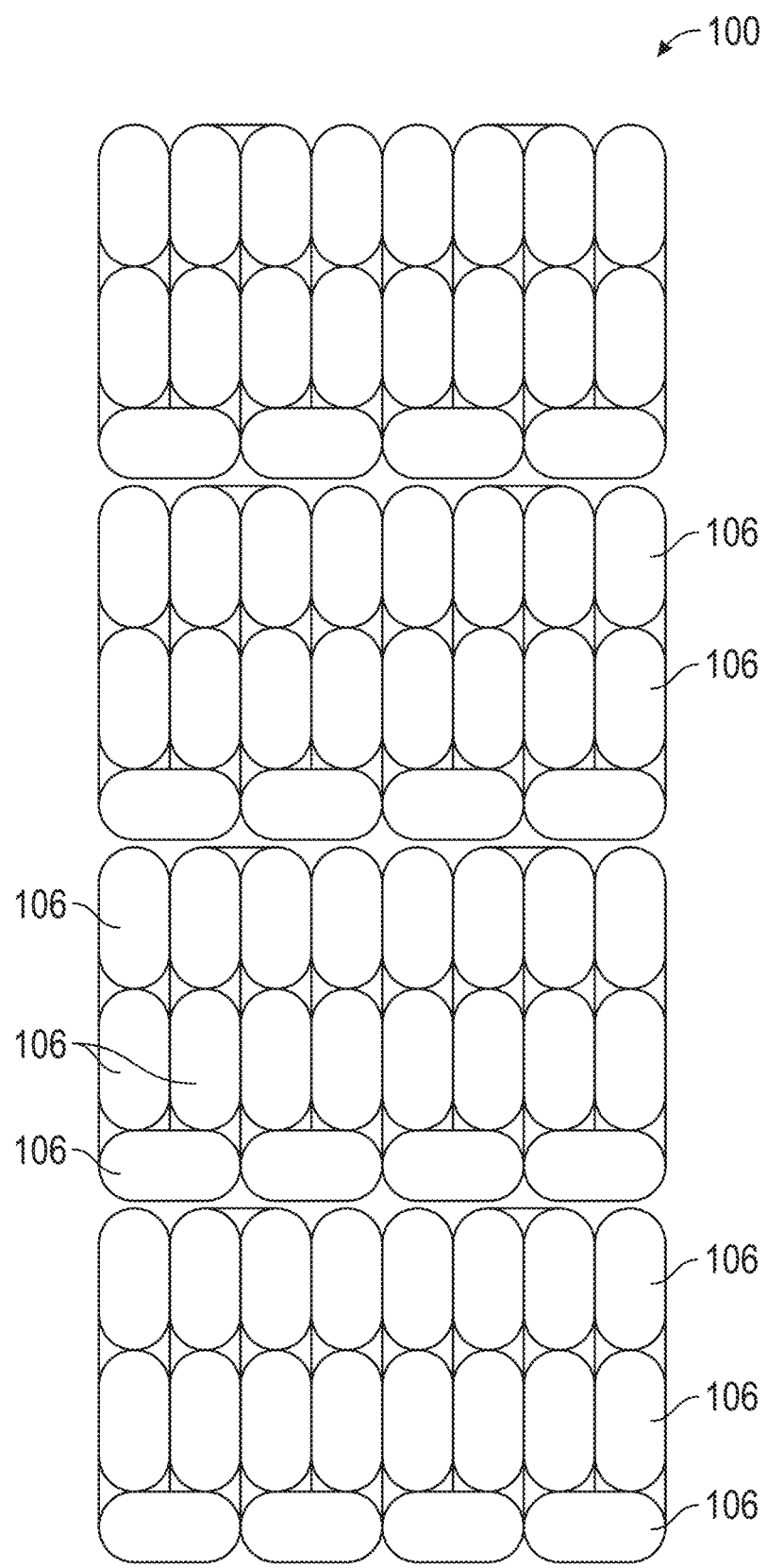
FIG. 16 is a top view of the configuration of FIG. 15.
Figure 17:
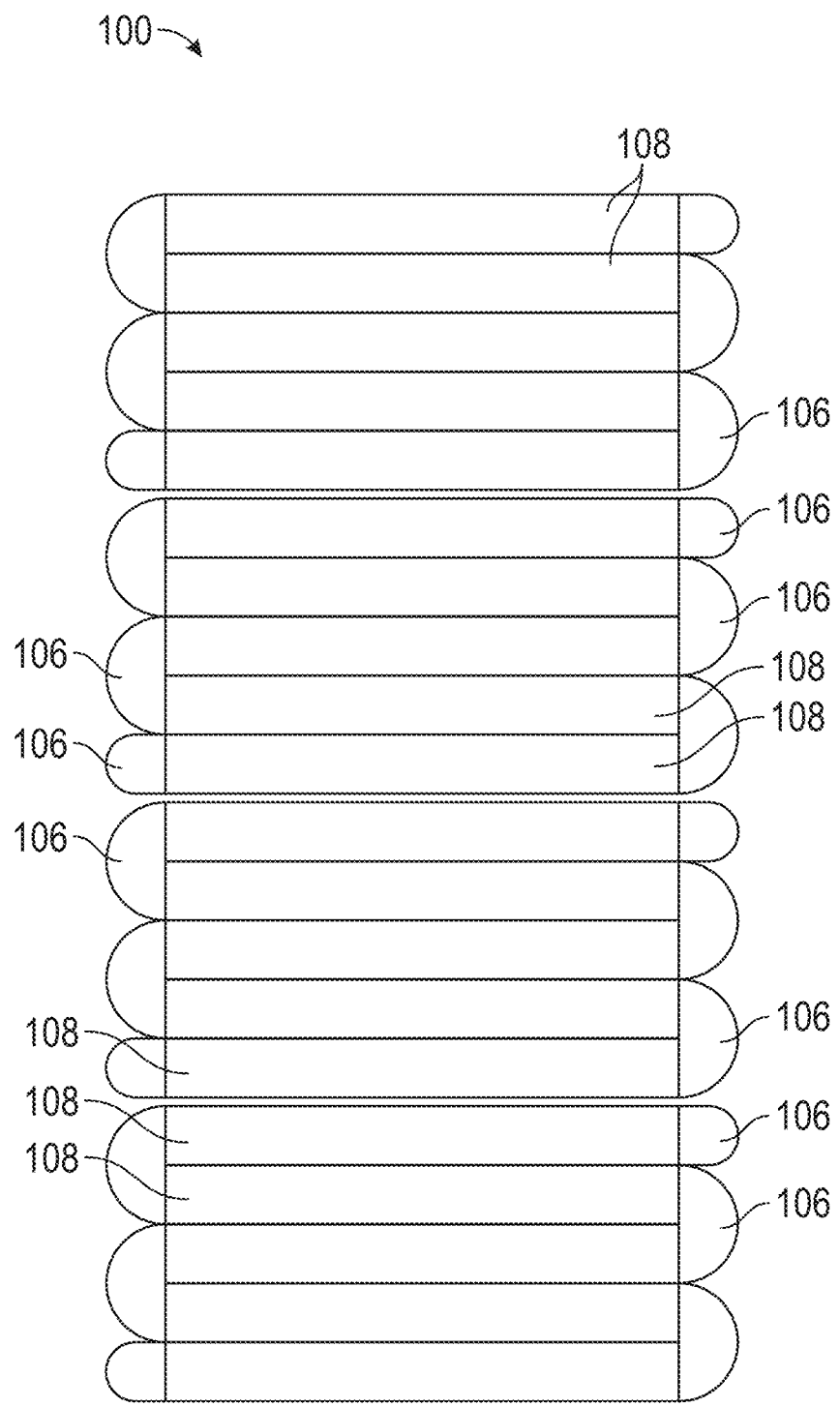
FIG. 17 is a side view of the configuration of FIG. 15.
Figure 18:
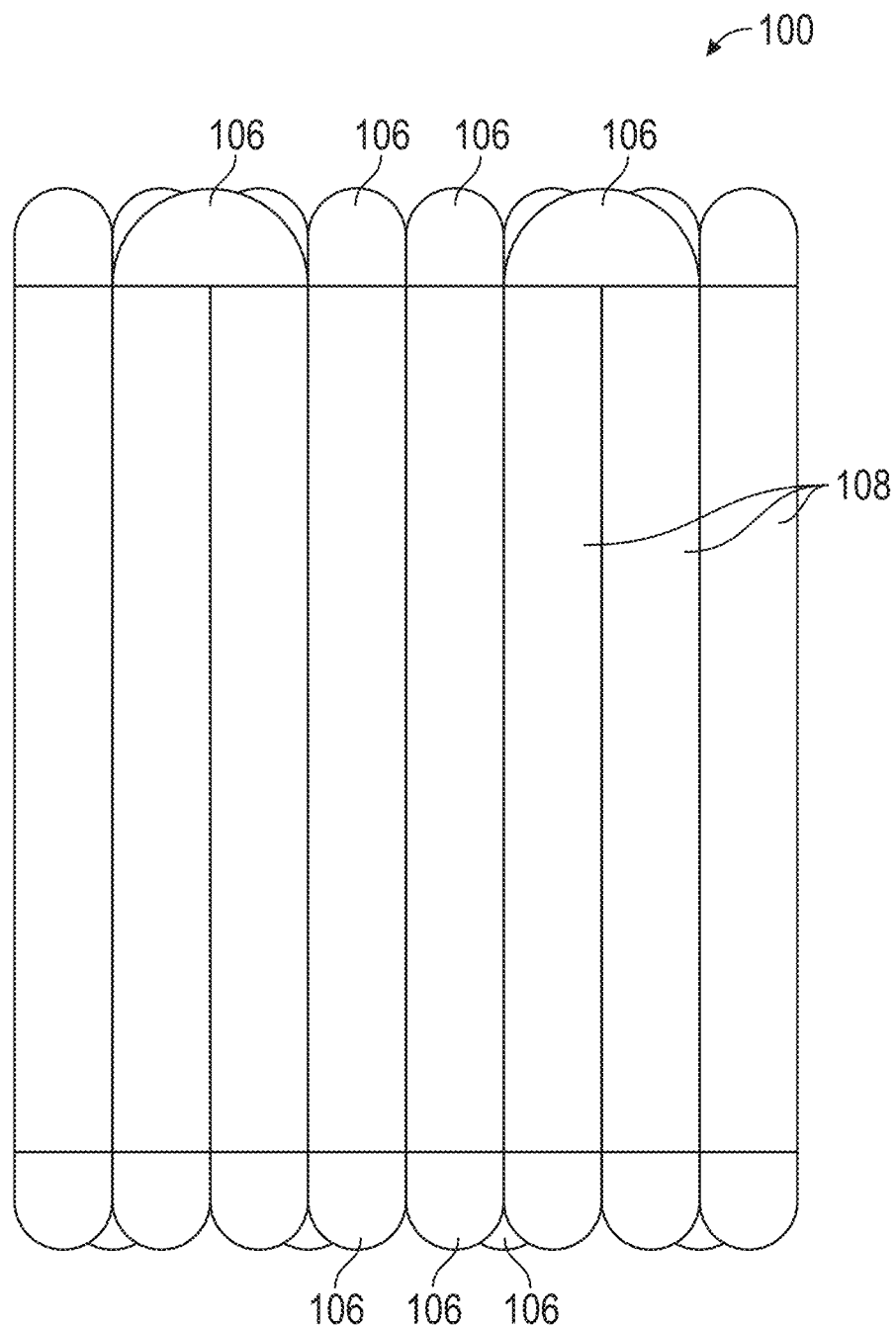
FIG. 18 is a front view of the configuration of FIG. 15.

Referring to FIGS. 3-6, because the pipe 100 includes the sections of collapsible corrugated pipe 106, the pipe 100 may be efficiently packaged for shipping of the pipe 100 even with the sections of non-collapsible corrugated pipe 108. As illustrated in FIG. 5, the pipe sub-section 124 is generally packaged such that the section of collapsible corrugated pipe 106 forms a bend that positions the sections of non-collapsible corrugated pipe 108 adjacent to each other. Depending on the number of pipe sub-sections 124, the pipe 100 may be efficiently packaged into various rectangular or cuboidal shapes (or other suitable shapes) to maximize the amount of pipe 100 within a given space. By comparison, pipe that is only constructed from non-collapsible pipe can only be packaged and sold in rolls, which are bulky and take up more space. For example, for a given amount of space on a seller's shelves, more of the pipe 100 may be stored on the shelves due to the efficient packaging compared to a similar length of pipe only constructed from non-collapsible pipe 108. Pipe that is only constructed from collapsible pipe may have insufficient structure for many environments or uses of the pipe.

FIGS. 7-10 illustrate another non-limiting example of a packaging configuration of the pipe 100. FIGS. 11-14 illustrate another non-limiting example of a packaging configuration of the pipe 100. FIGS. 15-18 illustrate another non-limiting example of a packaging configuration of the pipe 100.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A plastic drain pipe for drainage comprising: a first end; a second end; and a pipe sub-section between the first end and the second end comprising: a collapsible section of corrugated pipe having a first joining area and a second joining area; a first non-collapsible section of corrugated pipe connected to the collapsible section of corrugated pipe at the first joining area; and a second non-collapsible section of corrugated pipe connected to the collapsible section of corrugated pipe at the second joining area, wherein an outermost diameter of the collapsible section of corrugated pipe is approximately the same as an outermost diameter of the first non-collapsible section of corrugated pipe and an outermost diameter of the second non-collapsible section of corrugated pipe.

EC 2. The plastic drain pipe of any of the preceding or subsequent example combinations, wherein the pipe sub-section is a first pipe sub-section, and wherein the plastic drain pipe comprises a plurality of pipe sub-sections, each pipe sub-section comprising a collapsible section of corrugated pipe connected to two non-collapsible sections of corrugated pipe.

EC 3. The plastic drain pipe of any of the preceding or subsequent example combinations, wherein an end of the first non-collapsible section of corrugated pipe opposite the first joining area is the first end of the plastic drain pipe, and wherein an end of the second non-collapsible section of corrugated pipe opposite the second joining area is the second end of the plastic drain pipe.

EC 4. The plastic drain pipe of any of the preceding or subsequent example combinations, wherein the pipe sub-section is foldable into a packaged configuration such that the collapsible section of corrugated pipe forms a bend and the first non-collapsible section of corrugated pipe is positioned adjacent to the second non-collapsible section of corrugated pipe.

EC 5. The plastic drain pipe of any of the preceding or subsequent example combinations, wherein a length of the collapsible section of corrugated pipe is less than a length of the first non-collapsible section of corrugated pipe and less than a length of the second non-collapsible section of corrugated pipe.

EC 6. The plastic drain pipe of any of the preceding or subsequent example combinations, wherein a length of the collapsible section of corrugated pipe is approximately the same as a length of the first non-collapsible section of corrugated pipe and approximately the same as a length of the second non-collapsible section of corrugated pipe.

EC 7. A method of packaging a plastic drain pipe for drainage comprising: directing a collapsible section of corrugated pipe of a pipe sub-section between a first end and a second end of the plastic drain pipe to form a bend; and moving a first non-collapsible section of corrugated pipe connected to the collapsible section of corrugated pipe at a first joining area to be adjacent to a second non-collapsible section of corrugated pipe connected to the collapsible section of corrugated pipe at a second joining area of the collapsible section opposite the first joining area, wherein an outermost diameter of the collapsible section of corrugated pipe is approximately the same as an outermost diameter of the first non-collapsible section and an outermost diameter of the second non-collapsible section.

EC 8. The method of any of the preceding or subsequent example combinations, wherein the pipe sub-section is a first pipe sub-section, wherein the plastic drain pipe comprises a plurality of pipe sub-sections, each pipe sub-section comprising a collapsible section of corrugated pipe connected to two non-collapsible sections of corrugated pipe, and wherein the method further comprises directing each collapsible section of corrugated pipe to form a bend and moving the non-collapsible sections of corrugated pipe adjacent to one another.

EC 9. The method of any of the preceding or subsequent example combinations, wherein forming the bend in each collapsible section of corrugated pipe and moving the non-collapsible sections of corrugated pipe comprises forming a cuboid.

EC 10. The method of any of the preceding or subsequent example combinations, wherein the cuboid is square.

EC 11. The method of any of the preceding or subsequent example combinations, wherein the cuboid is rectangular.

EC 12. The method of any of the preceding or subsequent example combinations, wherein a length of the collapsible section of corrugated pipe is less than a length of the first non-collapsible section of corrugated pipe and less than a length of the second non-collapsible section of corrugated pipe.

EC 13. The method of any of the preceding or subsequent example combinations, wherein a length of the collapsible section of corrugated pipe is approximately the same as a length of the first non-collapsible section of corrugated pipe and approximately the same as a length of the second non-collapsible section of corrugated pipe.

EC 14. A package of plastic drain pipe for drainage comprising: a drain pipe comprising: a first end; a second end; and a pipe sub-section between the first end and the second end comprising: a collapsible section of corrugated pipe having a first joining area and a second joining area; a first non-collapsible section of corrugated pipe connected to the collapsible section of corrugated pipe at the first joining area; and a second non-collapsible section of corrugated pipe connected to the collapsible section of corrugated pipe at the second joining area, wherein an outermost diameter of the collapsible section of corrugated pipe is approximately the same as an outermost diameter of the first non-collapsible section of corrugated pipe and an outermost diameter of the second non-collapsible section of corrugated pipe, and wherein the collapsible section of corrugated pipe forms a bend and the first non-collapsible section of corrugated pipe is adjacent to the second non-collapsible section of corrugated pipe.

EC 15. The package of any of the preceding or subsequent example combinations, wherein the pipe sub-section is a first pipe sub-section, wherein the drain pipe comprises a second pipe sub-section between the first pipe sub-section and the second end, wherein the second pipe sub-section comprises: a collapsible section of corrugated pipe having a first joining area and a second joining area; a first non-collapsible section of corrugated pipe connected to the collapsible section of corrugated pipe at the first joining area; and a second non-collapsible section of corrugated pipe connected to the collapsible section of corrugated pipe at the second joining area, wherein the collapsible section of corrugated pipe forms a bend and the first non-collapsible section of corrugated pipe is adjacent to the second non-collapsible section of corrugated pipe.

EC 16. The package of any of the preceding or subsequent example combinations, wherein the second non-collapsible section of corrugated pipe of the first pipe sub-section forms the first non-collapsible section of corrugated pipe of the second pipe sub-section.

EC 17. The package of any of the preceding or subsequent example combinations, wherein the collapsible section of corrugated pipe of the first pipe sub-section and the collapsible section of corrugated pipe of the second pipe sub-section are bent such that the first non-collapsible section of corrugated pipe of the first pipe sub-section, the second non-collapsible section of corrugated pipe of the first pipe sub-section, the first non-collapsible section of corrugated pipe of the second pipe sub-section, and the second non-collapsible section of corrugated pipe of the second pipe sub-section are coplanar.

EC 18. The package of any of the preceding or subsequent example combinations, wherein the collapsible section of corrugated pipe of the first pipe sub-section and the collapsible section of corrugated pipe of the second pipe sub-section are bent such that at least two of the first non-collapsible section of corrugated pipe of the first pipe sub-section, the second non-collapsible section of corrugated pipe of the first pipe sub-section, the first non-collapsible section of corrugated pipe of the second pipe sub-section, and the second non-collapsible section of corrugated pipe of the second pipe sub-section are non-coplanar.

EC 19. The package of any of the preceding or subsequent example combinations, wherein the pipe sub-section is a first pipe sub-section, and wherein the drain pipe comprises a plurality of pipe sub-sections, each pipe sub-section comprising a collapsible section of corrugated pipe forming a bend and connected to two non-collapsible sections of corrugated pipe adjacent to one another.

EC 20. The package of any of the preceding or subsequent example combinations, wherein the package is cuboid.

EC 21. The package of any of the preceding or subsequent example combinations, wherein the cuboid is square.

EC 22. The package of any of the preceding or subsequent example combinations, wherein the cuboid is rectangular.

EC 23. The package of any of the preceding or subsequent example combinations, wherein a length of the collapsible section of corrugated pipe is less than a length of the first non-collapsible section of corrugated pipe and less than a length of the second non-collapsible section of corrugated pipe.

EC 24. The package of any of the preceding or subsequent example combinations, wherein a length of the collapsible section of corrugated pipe is approximately the same as a length of the first non-collapsible section of corrugated pipe and approximately the same as a length of the second non-collapsible section of corrugated pipe.

The above-described aspects are merely possible examples of implementations, merely set forth for a clear understanding of the principles of the present disclosure. Many variations and modifications can be made to the above-described example(s) without departing substantially from the spirit and principles of the present disclosure. All such modifications and variations are included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed is:

1. A plastic drain pipe for drainage comprising:
   a first end;
   a second end; and
   a pipe sub-section between the first end and the second end comprising:
      a collapsible section of corrugated pipe having a first joining area and a second joining area;
      a first non-collapsible section of corrugated pipe connected to the collapsible section of corrugated pipe at the first joining area, wherein the first non-collapsible section comprises a first plurality of corrugations; and
      a second non-collapsible section of corrugated pipe connected to the collapsible section of corrugated pipe at the second joining area, wherein the second non-collapsible section comprises a second plurality of corrugations,
      wherein an outermost diameter of the collapsible section of corrugated pipe is approximately the same as an outermost diameter of the first non-collapsible section of corrugated pipe and an outermost diameter of the second non-collapsible section of corrugated pipe.

2. The plastic drain pipe of claim 1, wherein the pipe sub-section is a first pipe sub-section, and wherein the plastic drain pipe comprises a plurality of pipe sub-sections, each pipe sub-section comprising a collapsible section of corrugated pipe connected to two non-collapsible sections of corrugated pipe.

3. The plastic drain pipe of claim 1, wherein an end of the first non-collapsible section of corrugated pipe opposite the first joining area is the first end of the plastic drain pipe, and wherein an end of the second non-collapsible section of corrugated pipe opposite the second joining area is the second end of the plastic drain pipe.

4. The plastic drain pipe of claim 1, wherein the pipe sub-section is foldable into a packaged configuration such that the collapsible section of corrugated pipe forms a bend and the first non-collapsible section of corrugated pipe is positioned adjacent to the second non-collapsible section of corrugated pipe.

5. The plastic drain pipe of claim 1, wherein a length of the collapsible section of corrugated pipe is less than a length of the first non-collapsible section of corrugated pipe and less than a length of the second non-collapsible section of corrugated pipe.

6. The plastic drain pipe of claim 1, wherein a length of the collapsible section of corrugated pipe is approximately the same as a length of the first non-collapsible section of corrugated pipe and approximately the same as a length of the second non-collapsible section of corrugated pipe.

7. A method of packaging a plastic drain pipe for drainage comprising:
   directing a collapsible section of corrugated pipe of a pipe sub-section between a first end and a second end of the plastic drain pipe to form a bend; and
   moving a first non-collapsible section of corrugated pipe connected to the collapsible section of corrugated pipe at a first joining area to be adjacent to a second non-collapsible section of corrugated pipe connected to the collapsible section of corrugated pipe at a second joining area of the collapsible section opposite the first joining area,
   wherein the first non-collapsible section comprises a first plurality of corrugations,
   wherein the second-non-collapsible section comprises a second plurality of corrugations, and
   wherein an outermost diameter of the collapsible section of corrugated pipe is approximately the same as an outermost diameter of the first non-collapsible section and an outermost diameter of the second non-collapsible section.

8. The method of claim 7, wherein the pipe sub-section is a first pipe sub-section, wherein the plastic drain pipe comprises a plurality of pipe sub-sections, each pipe sub-section comprising a collapsible section of corrugated pipe connected to two non-collapsible sections of corrugated pipe, and wherein the method further comprises directing each collapsible section of corrugated pipe to form a bend and moving the non-collapsible sections of corrugated pipe adjacent to one another.

9. The method of claim 8, wherein forming the bend in each collapsible section of corrugated pipe and moving the non-collapsible sections of corrugated pipe comprises forming a cuboid.

10. The method of claim 9, wherein the cuboid is square or rectangular.

11. The method of claim 7, wherein a length of the collapsible section of corrugated pipe is less than a length of the first non-collapsible section of corrugated pipe and less than a length of the second non-collapsible section of corrugated pipe.

12. The method of claim 7, wherein a length of the collapsible section of corrugated pipe is approximately the same as a length of the first non-collapsible section of corrugated pipe and approximately the same as a length of the second non-collapsible section of corrugated pipe.

13. A package of plastic drain pipe for drainage comprising:
   a drain pipe comprising:
      a first end;
      a second end; and
      a pipe sub-section between the first end and the second end comprising:
         a collapsible section of corrugated pipe having a first joining area and a second joining area;
         a first non-collapsible section of corrugated pipe connected to the collapsible section of corrugated pipe at the first joining area, wherein the first non-collapsible section comprises a first plurality of corrugations; and
         a second non-collapsible section of corrugated pipe connected to the collapsible section of corrugated pipe at the second joining area, wherein the second non-collapsible section comprises a second plurality of corrugations,
   wherein an outermost diameter of the collapsible section of corrugated pipe is approximately the same as an outermost diameter of the first non-collapsible section of corrugated pipe and an outermost diameter of the second non-collapsible section of corrugated pipe, and
   wherein the collapsible section of corrugated pipe forms a bend and the first non-collapsible section of corrugated pipe is adjacent to the second non-collapsible section of corrugated pipe.

14. The package of claim 13, wherein the pipe sub-section is a first pipe sub-section, wherein the drain pipe comprises a second pipe sub-section between the first pipe sub-section and the second end, wherein the second pipe sub-section comprises:
   a collapsible section of corrugated pipe having a first joining area and a second joining area;
   a first non-collapsible section of corrugated pipe connected to the collapsible section of corrugated pipe at the first joining area; and
   a second non-collapsible section of corrugated pipe connected to the collapsible section of corrugated pipe at the second joining area,
   wherein the collapsible section of corrugated pipe forms a bend and the first non-collapsible section of corrugated pipe is adjacent to the second non-collapsible section of corrugated pipe.

15. The package of claim 14, wherein the collapsible section of corrugated pipe of the first pipe sub-section and the collapsible section of corrugated pipe of the second pipe sub-section are bent such that the first non-collapsible section of corrugated pipe of the first pipe sub-section, the second non-collapsible section of corrugated pipe of the first pipe sub-section, the first non-collapsible section of corrugated pipe of the second pipe sub-section, and the second non-collapsible section of corrugated pipe of the second pipe sub-section are coplanar.

16. The package of claim 14, wherein the collapsible section of corrugated pipe of the first pipe sub-section and the collapsible section of corrugated pipe of the second pipe sub-section are bent such that at least two of the first non-collapsible section of corrugated pipe of the first pipe sub-section, the second non-collapsible section of corrugated pipe of the first pipe sub-section, the first non-collapsible section of corrugated pipe of the second pipe sub-section, and the second non-collapsible section of corrugated pipe of the second pipe sub-section are non-coplanar.

17. The package of claim 13, wherein the pipe sub-section is a first pipe sub-section, and wherein the drain pipe comprises a plurality of pipe sub-sections, each pipe sub-section comprising a collapsible section of corrugated pipe forming a bend and connected to two non-collapsible sections of corrugated pipe adjacent to one another.

18. The package of claim 17, wherein the package is cuboid, square, or rectangular.

19. The package of claim 13, wherein a length of the collapsible section of corrugated pipe is less than a length of the first non-collapsible section of corrugated pipe and less than a length of the second non-collapsible section of corrugated pipe.

20. The package of claim 13, wherein a length of the collapsible section of corrugated pipe is approximately the same as a length of the first non-collapsible section of corrugated pipe and approximately the same as a length of the second non-collapsible section of corrugated pipe.

* * * * *